United States Patent
Doi et al.

(10) Patent No.: US 6,799,036 B2
(45) Date of Patent: Sep. 28, 2004

(54) COMMUNICATION CONTROLLER, BASE STATION CONTROLLER AND COMMUNICATION SYSTEM

(75) Inventors: Ayano Doi, Kawasaki (JP); Tsudoi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 10/133,997

(22) Filed: Apr. 24, 2002

(65) Prior Publication Data

US 2002/0128042 A1 Sep. 12, 2002

Related U.S. Application Data

(63) Continuation of application No. PCT/JP99/06894, filed on Dec. 8, 1999.

(51) Int. Cl.⁷ .............................. H04Q 7/20; H04M 1/00
(52) U.S. Cl. ................................ 455/432.1; 455/432.3; 455/436; 455/440; 455/551
(58) Field of Search ......................... 455/432.1, 432.2, 455/432.3, 433, 434, 435.1, 435.2, 410, 418, 419, 420, 421, 422.1, 462, 425, 436, 550.1, 551, 440

(56) References Cited

U.S. PATENT DOCUMENTS

| | | | | |
|---|---|---|---|---|
| 5,471,643 A | * | 11/1995 | Marui | 455/33.1 |
| 5,588,042 A | * | 12/1996 | Comer | 379/59 |
| 5,610,919 A | * | 3/1997 | Willard et al. | 370/336 |
| 5,854,980 A | * | 12/1998 | Takahashi et al. | 455/434 |
| 6,006,107 A | * | 12/1999 | Tomioka et al. | 455/552 |
| 6,047,179 A | * | 4/2000 | Kirby | 455/432 |
| 6,073,029 A | * | 6/2000 | Smith et al. | 455/555 |

FOREIGN PATENT DOCUMENTS

| | | | | |
|---|---|---|---|---|
| JP | 405014271 a | * | 1/1993 | H04B/7/04 |
| JP | 07-307975 | | 11/1995 | |
| JP | 08-237736 | | 9/1996 | |
| JP | 09-018936 | | 1/1997 | |
| JP | 09-215031 | | 8/1997 | |
| JP | 10-304428 | | 11/1998 | |
| JP | 11-032087 | | 2/1999 | |
| JP | 11-122669 | | 4/1999 | |
| WO | WO 97/26769 | * | 7/1997 | H04Q/7/38 |

* cited by examiner

Primary Examiner—William Trost
Assistant Examiner—Meless Zewdu
(74) Attorney, Agent, or Firm—Katten Muchin Zavis Rosenman

(57) ABSTRACT

There are provided a communication controller, a base station controller and a communication system that employs a connection control of roaming applied to WLL and efficiently makes a connection and continuously provides communication service even when a subscriber changes the area. An identification number management unit manages a home area identification number assigned to the subscriber terminal in the home area and a roaming area identification number assigned thereto in the roaming area. A call connection processing unit translates the home area identification number and the roaming area identification number into each other for call connection processing.

8 Claims, 12 Drawing Sheets

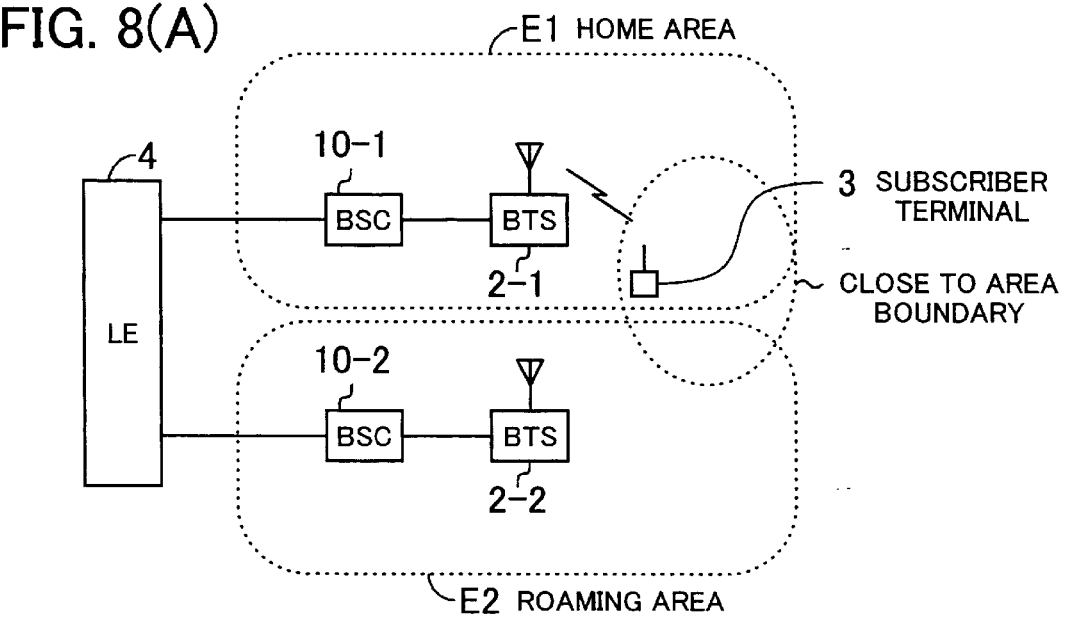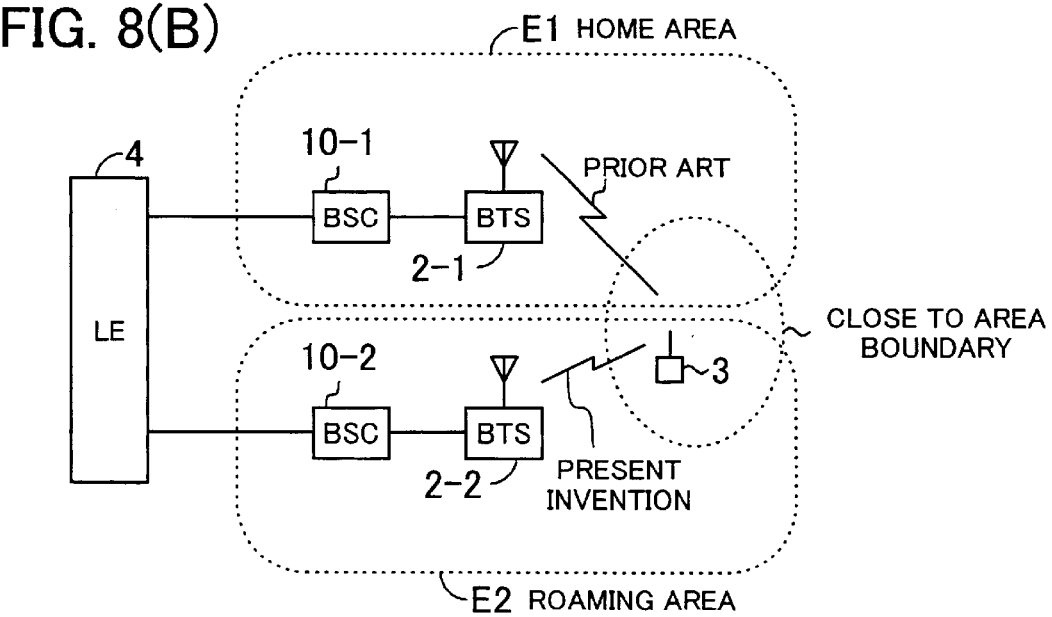

COMMUNICATION CONTROLLER, BASE STATION CONTROLLER AND COMMUNICATION SYSTEM

This application is a continuation of PCT/JP99/06894 filed Dec. 8, 1999.

BACKGROUND OF THE INVENTION

1. Field of the Invention

The present invention relates to a communication controller, a base station controller and a communication system, and more particularly, to a communication controller that performs a connection control of roaming when a subscriber terminal moves from the home area to another area and a communication controller that performs a connection control of a subscriber terminal located in the home area or roaming area. The present invention is also concerned with a base station controller that performs a connection control of a roaming when the subscriber terminal moves from the home area to another area. Further, the present invention relates to a communication system that performs a connection control of roaming when the subscriber terminal moves from the home area to another area in WLL (Wireless Local Loop).

2. Description of the Related Art

Recently, attention has been drawn to a WLL system in which subscriber lines are implemented by wireless channels in the access system from a switch to subscriber terminals. Generally, the wireless system is utilized in an isolated island, desert or mountainous area with difficulty in laying cables. However, recently, the wireless system has been increasingly utilized in urban areas because it may reduce the construction period and cost.

FIG. 12 is a diagram of a basic structure of the WLL system. The WLL system is made up of a local exchange 40 in a public network 400, base station controllers (BSC) 101 and 102, base transceiver stations (BTS) 201 and 202, and subscriber terminals 301–303.

The subscriber terminal 301 includes a stationary telephone set 301b and a subscriber unit 301a connected thereto and involved in wireless communication. The subscriber terminals 302 and 303 have the same structure as described above.

The exchange 40 is connected to the BSCs 101 and 102. The BSC 101 is connected to the BTS 201, which is connected to the subscriber terminals 301 and 302 via radio channels. The BSC 102 is connected to the BTS 202, which is connected to the subscriber terminal 303 via a radio channel.

The BSC 101, BTS 201, and the subscriber terminals 301 and 302 are located in an area E10, and the BSC 102, BTS 202, and subscriber terminal 303 are located in an area E20.

The BSCs 101 and 102 accommodate a plurality of wireless base stations, and communicates with the exchange 40 in protocol exchange processing. The BTSs 201 and 202 communicate with the subscriber terminals 301–303 on the air using radio waves (wireless channels).

The interface between the exchange 40 and the BSCs 101 and 102 is, for example, V5.2 that is the ETS (European Telecommunication Standard) 300, 347. The air interface between the BTSs 201 and 202 and the subscriber terminals 301–303 is, for example, a connection making system that conforms to CDMA or PHS.

However, the conventional WLL system described above is on the condition that the stationary telephone sets are used even when the subscriber channels are wireless. Thus, for example, in a case where the user initially contracts a communication service in the area E10 (home area), when the user moves to another area E20 (roaming area) out of contract due to relocation, the user cannot receive the communication service.

In that case, it is necessary to rewrite subscriber data managed in the exchange 40 and the BSC 102 and to rewrite the telephone number in order to enable the user to receive the communication service in the area E20. As described above, the conventional WLL system does not consider connection control of roaming and takes a lot of trouble in rewriting. Thus, the conventional WLL system does not have good convenience.

When the subscriber terminal is used close to the boundary, the conventional WLL system allows the user to be connected to only the registered area although the user should be originally connected to the area in which the better radio condition for communication is available.

SUMMARY OF THE INVENTION

Taking the above into consideration, it is an object of the present invention to provide a communication controller that employs a connection control of roaming in WLL and provides communication services by efficiently making a connection even when the subscriber changes the area.

Another object of the present invention is to provide a base station controller that employs a connection control of roaming in WLL and provides communication services by efficiently making a connection even when the subscriber changes the area.

A further object of the present invention is to provide a communication system that employs a connection control of roaming in WLL and provides communication services by efficiently making a connection even when the subscriber changes the area.

The above objects of the present invention are achieved by a communication controller performing a connection control of roaming in which a subscriber terminal moves from a home area to a roaming area, said communication controller comprising: identification number management unit which manages a home area identification number assigned to the subscriber terminal in the home area and a roaming area identification number assigned thereto in the roaming area; and call connection processing unit which translates the home area identification number and the roaming area identification number into each other for call connection processing.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8(A) shows a situation in which a subscriber terminal is located in the home area;

FIG. 8(B) shows a situation in which a subscriber terminal is located in a roaming area;

DESCRIPTION OF THE PREFERRED EMBODIMENTS

Figure 1:
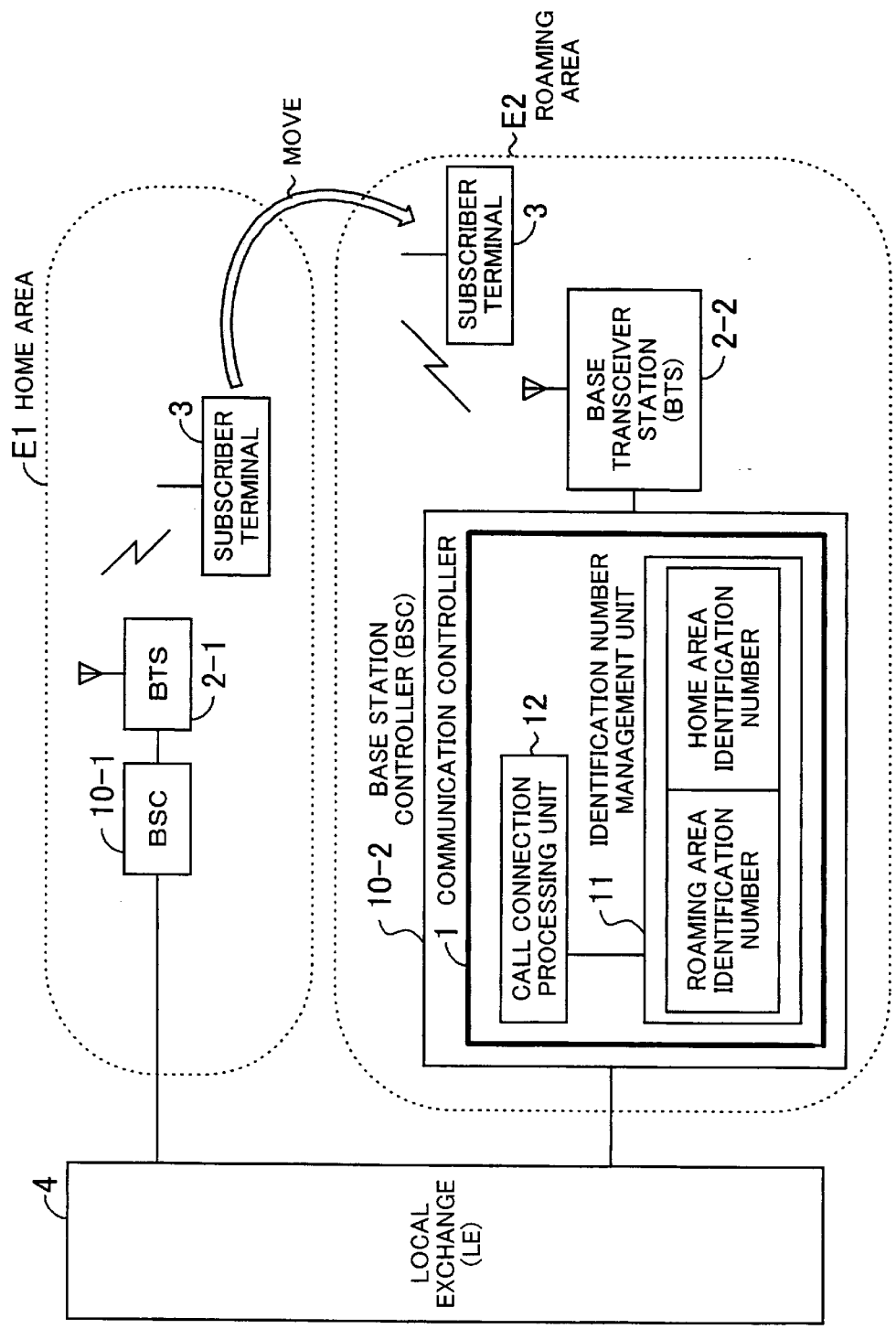
FIG. 1 is a diagram of the principles of a communication controller of the present invention.

A description will be given of embodiments of the present invention with reference to the accompanying drawings. FIG. 1 shows the principles of the communication controller of the present invention. A communication controller 1 is provided in a base station controller (BSC) 10-2 in a WLL communication system. The communication controller 1 performs a connection control when a subscriber terminal moves from the home area to a roaming area.

The roaming in the present invention makes it possible for the subscriber to receive the communication service in an area (roaming area) other than the home area in which the subscriber initially contracted the WLL communication service.

The home area is the service area in which the subscriber initially contracts the WLL communication service.

The roaming area is an area other than the home area in which a communication takes place. For example, the roaming area may be an area to which the subscriber terminal moves from the home area thereof or an area in which a better condition for wireless communication is available and therefore the subscriber terminal located in the home area close to the above area moves thereto.

A local exchange (hereinafter simply referred to as LE) 4 is connected to BSCs 10-1 and 10-2. The BSC 10-1 is connected to a base transceiver station (BTS) 2-1, and the BSC 10-2 is connected to BTS 2-2. The BSC 10-1 and BTS 2-1 are located in the home area E1, and BSC 10-2 and BTS 2-2 are located in a roaming area E2.

The BTSs 2-1 and 2-2 make a connection with the subscriber terminal 3 via wireless channels. FIG. 1 shows that the subscriber terminal 3 moves to the roaming area E2 from the home area E1.

An identification number management unit 11 manages a home area identification number assigned in the home area E1, and a roaming area identification number assigned in the roaming area E2.

A call connection processing unit 12 exchanges the home area identification number and the roaming area identification number for call connection processing.

For instance, when a calling request is issued by the subscriber terminal 3 in the roaming area E2, a called request is issued against the subscriber terminal 3 in the roaming area E2, an air interface side (air interface side with the subscriber terminal 3 via BTS 2-2) makes a call connection with the home area identification number, while an exchange interface side (interface side with the local exchange 4) makes a connection call with the roaming area identification number.

Figure 2:
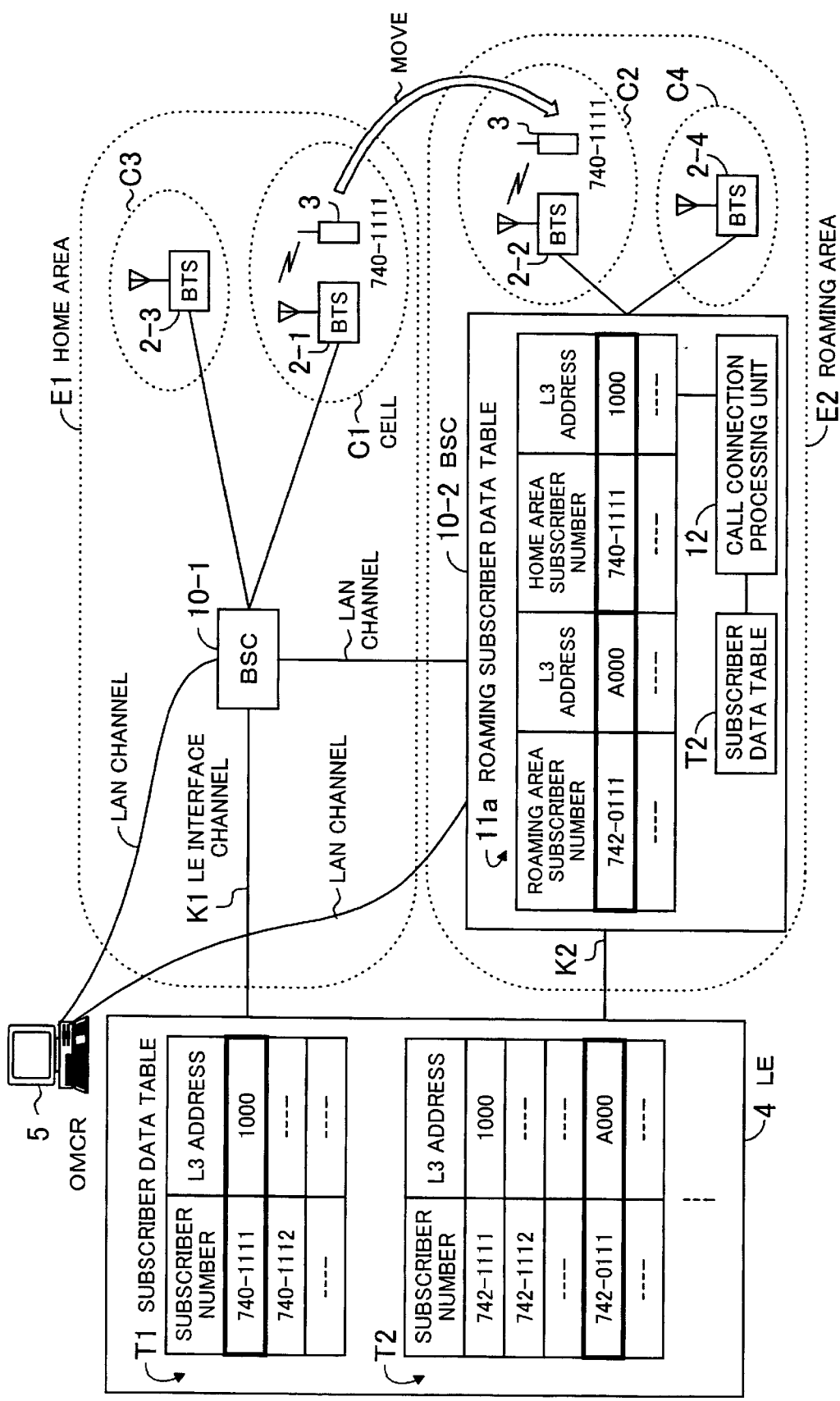
FIG. 2 is a diagram of a communication system of the present invention.

A further description is now given of the present invention. FIG. 2 shows a communication system of the present invention. The present communication system is a WLL communication system including a BSC to which the communication controller 1 is applied. Although FIG. 2 shows only the communication controller 1 in the BSC 10-2, each BSC includes the communication controller 1 in practice.

LE 4 is connected to the BSCs 10-1 and 10-2 via LE interface channels K1 and K2. The BSC 10-1 is connected to BTSs 2-1 and 2-3, and BSC 10-2 is connected to BTSs 2-2 and 2-4.

The BTSs 2-1–2-4 are respectively included in cells C1–C4. The BSCs 10-1 and cells C1 and C3 are located in the home area E1, and BSC10-2 and cells C2 and C4 are located in the roaming area E2.

The BTSs 2-1 and 2-2 are connected to the subscriber terminal 3 via wireless channels. FIG. 2 shows that the subscriber terminal 3 moves to the roaming area E2 from the home area E1.

A remote operation and maintenance center radio (OMCR) 5, which corresponds to the operation and maintenance device of the present invention, and BSCs 10-1 and 10-2 are connected via a LAN channel. The LE 4 has subscriber data tables T1 and T2, which store, as subscriber data, the identification numbers (telephone numbers) of the subscriber terminals and the L3 addresses (network addresses) assigned to the respective subscriber terminals.

In FIG. 2, the subscriber data table T1 relates to data of the subscribers who can be registered in the home area E1, and the subscriber data table T2 relates to data of subscribers who can be registered in the roaming area E2.

The BSC 10-2 has a roaming area subscriber data table 11a and a subscriber data table T2 (which is the same as the subscriber data table T2 owned by LE 4), and is managed by the identification number management unit 11.

The home area identification number is a home area subscriber number. The roaming area identification number is composed of a roaming area subscriber number and a roaming area network address (hereinafter referred to as L3 address as in the case of the above-mentioned L3 address).

It is assumed that the subscriber terminal 3 is assigned a subscriber number of 740-1111 (represented in the absence of the area code) at the time of the first registration in the home area E1 and thereafter moves to the roaming area E2.

When the user of the subscriber terminal 3 moves to the roaming area E2, the user notifies the communication service provider with such a movement in advance, and is simultaneously registered with a transfer setting service provided by the exchange (a notification of use in the roaming area E2 is filed).

The communication service provider downloads, as roaming subscriber data, the home area identification number and the roaming area identification number of the subscriber terminal 3 from the OMCR 5 that manages the BSCs 10-1 and 10-2 integrally to BSC 10-2. These data items are managed by the roaming subscriber data table 11a.

The roaming subscriber data are assumed so that the home area subscriber number is 740-1111, the roaming subscriber number is 742-0111, and the L3 address corresponding to the roaming subscriber number is A000.

The roaming area subscriber number (742-0111) and the L3 address (A000) use subscriber data that are not used and are already registered with the subscriber data table T2 of LE 4.

Figure 3:
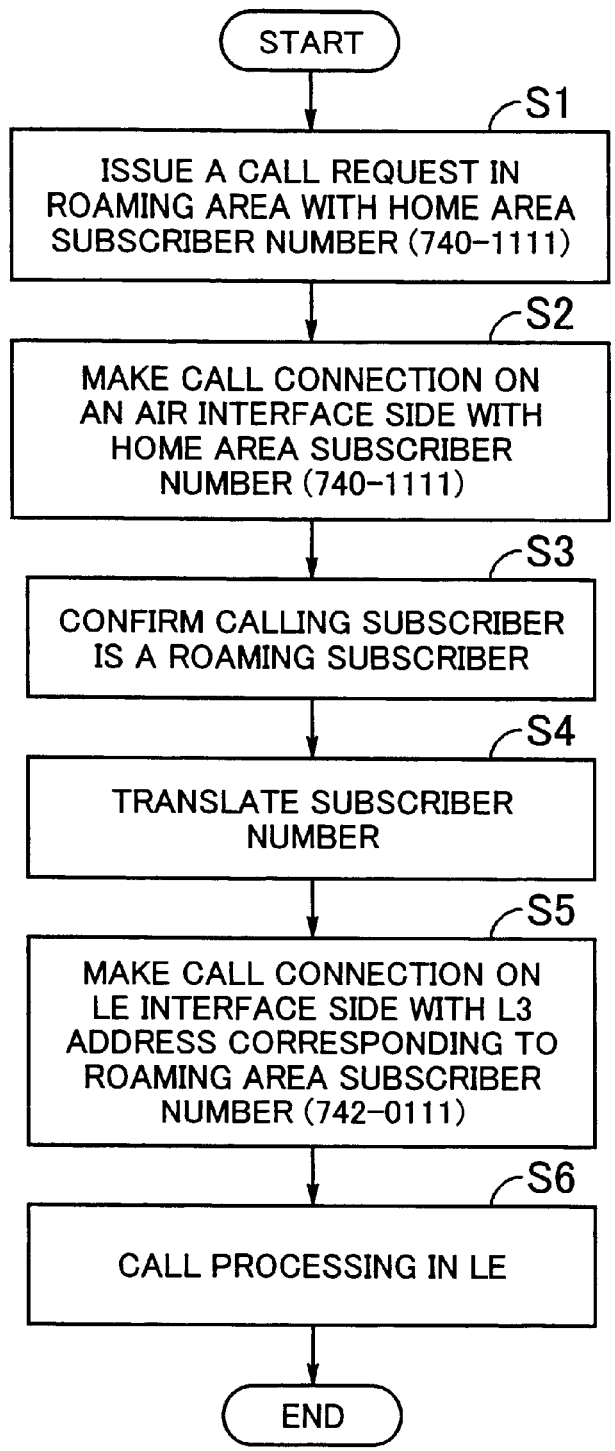
FIG. 3 is a flowchart of an operation at the time of calling.

Next, a description will be given of an operation when the subscriber terminal 3 issues a calling request in the roaming area E2. FIG. 3 is a flowchart of the operation performed at the time of calling.

In step S1, the subscriber terminal 3 in the roaming area E2 issues a calling request using the subscriber number 740-1111 registered in the home area E1.

In step S2, the call connection processing unit 12 in the BSC 10-2 makes a call connection via BTS 2-2 with the home area subscriber number (740-1111) and receives the calling request.

In step S3, the call connection processing unit 12 in the BSC 10-2 recognizes, from the received calling request, that the calling subscriber is a roaming subscriber.

In step S4, the call connection processing unit 12 in the BSC 10-2 translates the home area subscriber number (740-1111) into the roaming area subscriber number (742-0111).

In step S5, the call connection processing unit 12 in the BSC 10-2 makes a call connection with the LE 4 with the L3 address (A000) corresponding to the roaming area subscriber number (742-0111) after translation, and sends the calling request.

In step S6, LE 4 recognizes, from the L3 address (A000) in the calling request from the BSC 10-2, that the calling subscriber is (742-0111), and carries out the call processing.

In the manner described above, at the time of calling, the BSC 10-2 performs the call connection processing with the roaming area number (742-0111) on the LE interface side and with the home area subscriber number (740-0111) on the air interface side.

Figure 4:
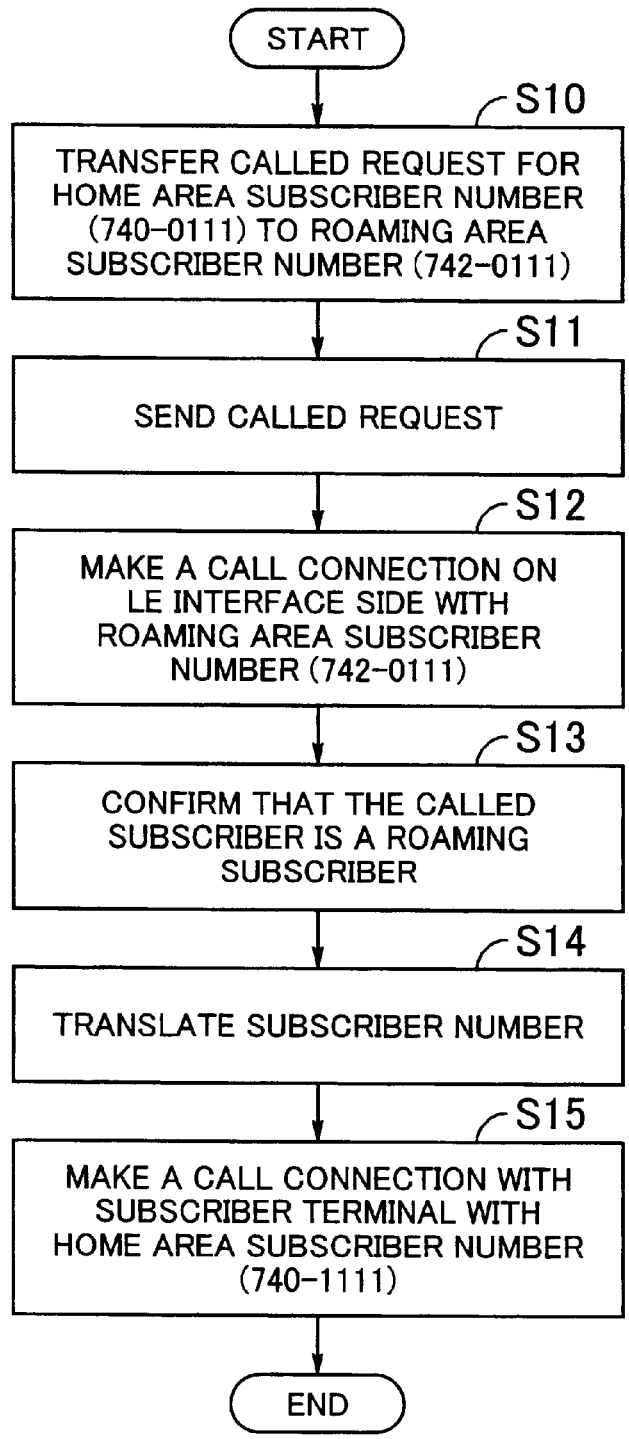
FIG. 4 is a flowchart of an operation at the time of receiving a call.

Next, a description will be given of an operation performed when a called request is issued against the subscriber terminal 3 in the roaming area. FIG. 4 is a flowchart of an operation at the time of call receiving.

In step S10, when the LE 4 receives the called request against the home area subscriber number (740-1111), it transfers the roaming area subscriber number (742-0111) in the LE4 by using the transfer function originally provided in the LE 4 by means of transfer setting ordered to the communication service provider in advance.

In step S11, the LE 4 sends to the BSC 10-2 the called request that includes the L3 address (A000) corresponding to the roaming area subscriber number (742-0111).

In step S12, the call connection processing unit 12 in the BSC 10-2 makes a call connection with the L3 address (A000) corresponding to the roaming area subscriber number (742-0111) on the LE interface side, and receives the called request.

In step S13, the call connection processing unit 12 in the BSC 10-2 confirms, from the called request from the LE4, that the called subscriber is a roaming subscriber.

In step S14, the call connection processing unit 12 in the BSC 10-2 translates the roaming area subscriber number (742-0111) into the home area subscriber number (740-1111) with the roaming subscriber data table 11a.

In step S15, the call connection processing unit 12 in the BSC 10-2 makes a call connection with the subscriber terminal 3 via BTS 2-2, and sends the called request.

In the manner described above, at the time of call receiving, the BSC 10-2 performs the call connection processing with the roaming area subscriber number (742-0111) on the LE interface side and with the subscriber number (740-0111) of the subscriber terminal on the air interface side.

In the description given above, in the LE, when the called request against the home area subscriber number (740-1111) is issued, it is directly transferred to the roaming area subscriber number (742-0111) and is accessed to the BSC 10-2. In a certain transfer mode of the LE 4, when the BSC 10-1 in the home area E1 is called and if no reply is received, the request may be transferred to the roaming area subscriber number (742-0111) and then may be accessed to the BSC 10-2 in the roaming area E2.

A description will now be given of location registration from the subscriber terminal 3 in the roaming area E2.

In step S20, the subscriber terminal 3 sends a location registration request to the BTS 2-2.

In step S21, the BTS 2-2 sends the location registration request to the BSC 10-2.

In step S22, the call connection processing unit 12 of the BSC 10-2 determines whether the subscriber terminal 3 has been registered with the roaming subscriber data table 11a. If registration has been made, the process proceeds to step S23. Otherwise, the process proceeds to step S25.

In step S23, the call connection processing unit 12 of the BSC 10-2 sends a location registration acceptance to the BTS 2-2.

In step S24, the BTS 2-2 sends the location registration acceptance response to the subscriber terminal 3 (location registration acceptance).

In step S25, the call connection processing unit 12 of the BSC 10-2 sends a location registration rejection to the BTS 2-2.

In step S26, the call connection processing unit 12 of the BTS 2-2 sends the location registration rejection to the subscriber terminal 3 (location registration rejection).

Figure 6:
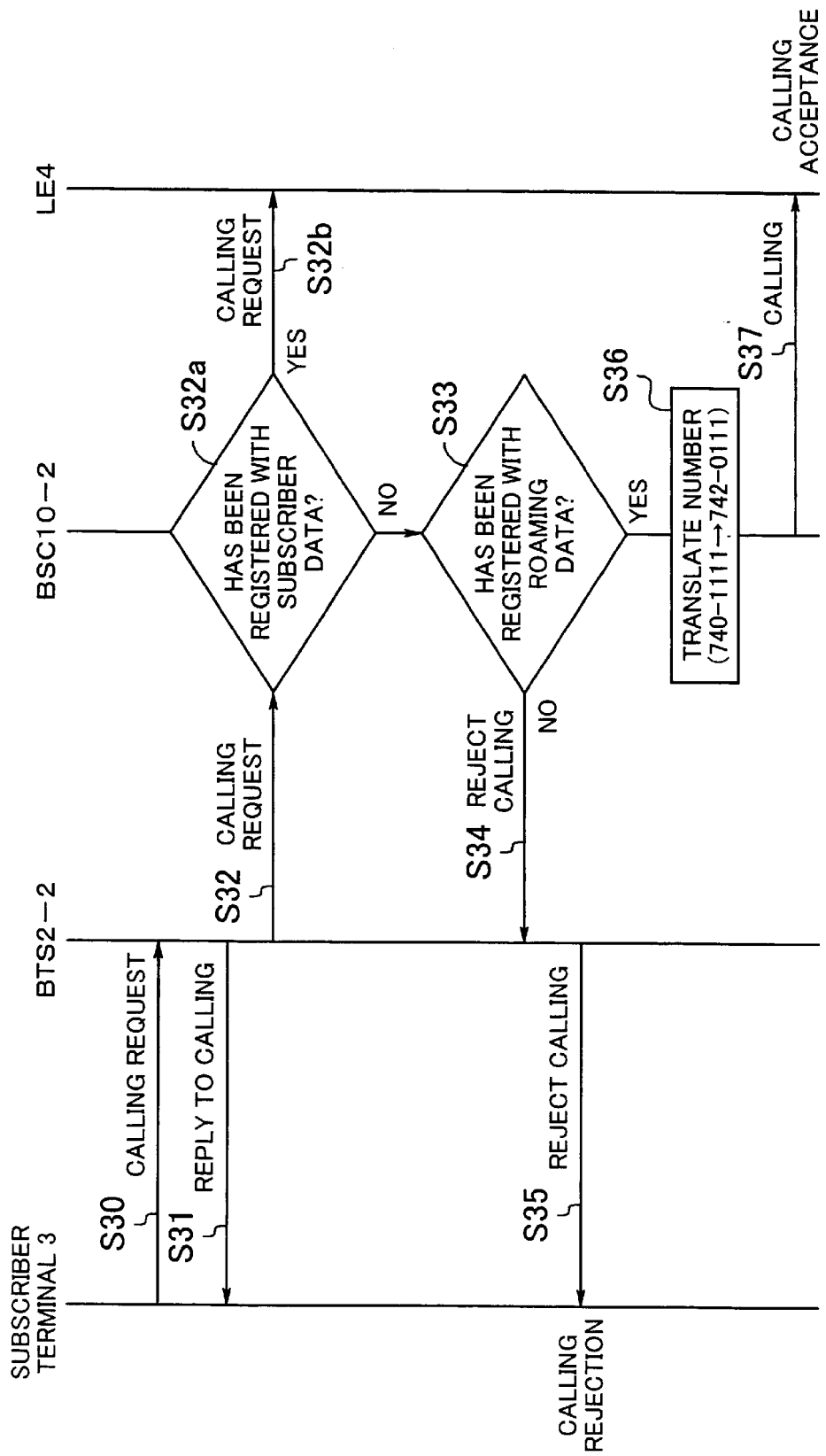
FIG. 6 shows a calling sequence.

A description will now be given of an operation of calling from the subscriber terminal 3 in the roaming area E2 with reference to the sequence shown in FIG. 6.

In step S30, the subscriber terminal 3 sends the calling request to the BTS 2-2 with the home area subscriber number (740-1111).

In step S31, the BTS 2-2 sends the calling response to the subscriber terminal 3.

In step S32, the BTS 2-2 sends the calling request to the BSC 10-2.

In step S32a, the call connection processing unit 12 of the BSC 10-2 determines whether the subscriber terminal 3 has been registered with the subscriber data table T2. If the answer is affirmative, the process proceeds to step S32b. Otherwise, the process proceeds to step S33.

In step S32b, the BSC 10-2 issues the calling request against the LE 4.

In step S33, the call connection processing unit 12 of the BSC 10-2 determines whether the subscriber terminal 3 has been registered with the roaming subscriber data table 11a. If registration has been made, the process proceeds to step S36. Otherwise, the process proceeds to step S34.

In step S34, the call connection processing unit 12 of the BSC 10-2 sends the rejection of calling to the BTS 2-2.

In step S35, the call connection processing unit 12 of the BTS 2-2 sends the rejection of calling to the subscriber terminal 3 (calling NG).

In step S36, the call connection processing unit 12 of the BSC 10-2 translates the home area subscriber number (740-1111) into the roaming area subscriber number (742-0111) with the roaming subscriber data table 11a.

In step S37, the call connection processing unit 12 of the BSC 10-2 calls the LE 4 with the L3 address (A000) of the roaming area subscriber number (742-0111) (calling acceptance).

Figure 7:
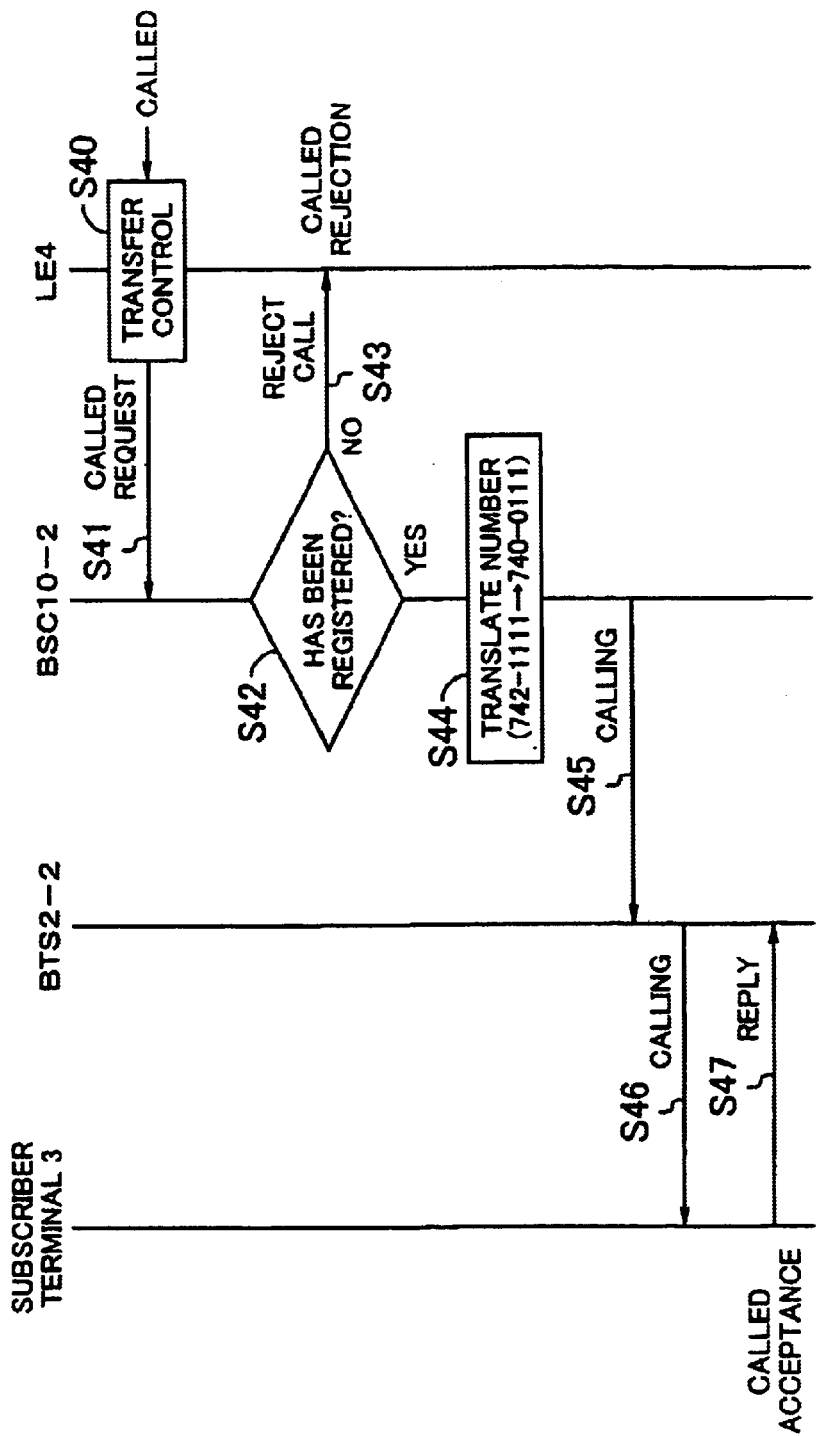
FIG. 7 shows a called sequence.

A description will now be given of an operation when the subscriber terminal 3 in the roaming area E2 is called. FIG. 7 shows a sequence at the time of call receiving.

In step S40, the LE 4 performs transfer control as described in step S10 of FIG. 4 when the subscriber terminal 3 is called.

In step S41, the LE 4 sends the BSC 10-2 the called request including the L3 address (A000) corresponding to the roaming area subscriber number (742-0111).

In step S42, the call connection processing unit 12 of the BSC 10-2 determines whether the subscriber terminal 3 has been registered with the roaming subscriber data table 11a. If such registration has been made, the process proceeds to step S44. Otherwise, the process proceeds to step S43.

In step S43, the call connection processing unit 12 of the BSC 10-2 sends the rejection of call to the LE 4 (called rejection).

In step S44, the call connection processing unit 12 of the BSC 10-2 translates the roaming area subscriber number (742-0111) to the home area subscriber number (740-1111) with the roaming area subscriber data table 11a.

In step S45, the call connection processing unit 12 of the BSC 10-2 calls the BTS 2-2 with the home area subscriber number (740-1111).

In step S46, the BTS 2-2 calls the subscriber terminal 3.

In step S47, the subscriber terminal 3 responds to the calling from the BTS 2-2.

Next, a description will be given of a case where the subscriber terminal 3 is located close to the area boundary. FIGS. 8(A) and 8(B) respectively show a case where the subscriber terminal 3 is located close to the area boundary. More particularly, FIG. 8(A) shows a situation in which the subscriber terminal 3 is located in the home area E1, and FIG. 8(B) shows a situation in which the subscriber terminal 3 is located in the roaming area E2. The connections between the devices have been described and a description thereof will be therefore omitted here.

As shown in FIGS. 8(A) and 8(B), the subscriber terminal 3 located close to the boundary between the home area E1 and the roaming area E2 is located in the home area E1 or the roaming area E2 due to the influence of the radio condition.

In FIG. 8(A), the subscriber terminal 3 located close to the area boundary is located in the home area E1 initially contracted, and thus communicates with another terminal via the BTS 2-1 and BSC 10-1 within the home area E1.

In FIG. 8(B), the subscriber terminal 3 located close to the area boundary is located in the roaming area E2 due to the influence of the radio condition. Since the conventional WLL system does not have the roaming function, it cannot be connected to the BTS 2-2 in the roaming area E2 (cannot be registered with the BSC 10-2), but is connected to the BTS 2-1 located in the area in which the radio condition is not good.

On the contrary, the subscriber terminal 3 registers, with the communication service provider in advance, with information showing the subscriber terminal 3 is located close to the boundary between the home area E1 and the roaming area E2. Simultaneously, the setting of transfer is registered. Thus, even when the subscriber terminal 3 is located in the roaming area E2, it can be registered with the BSC 10-2 in the roaming area E2 in which the radio condition is good. The subscriber terminal 3 can communicate with another terminal via the BTS 2-2 and BSC 10-2.

Figure 5:
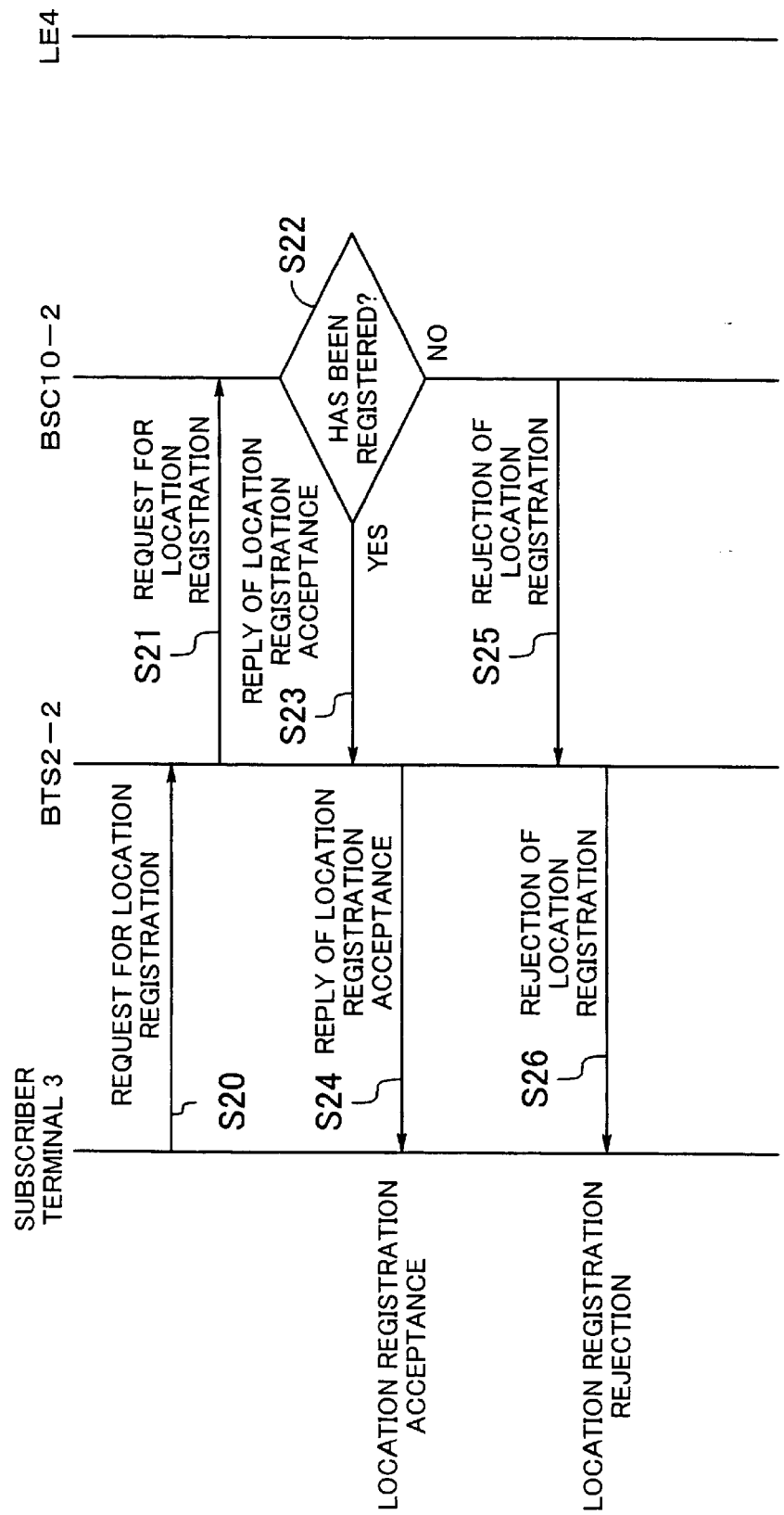
FIG. 5 is a sequence of location registration.
Figure 9:
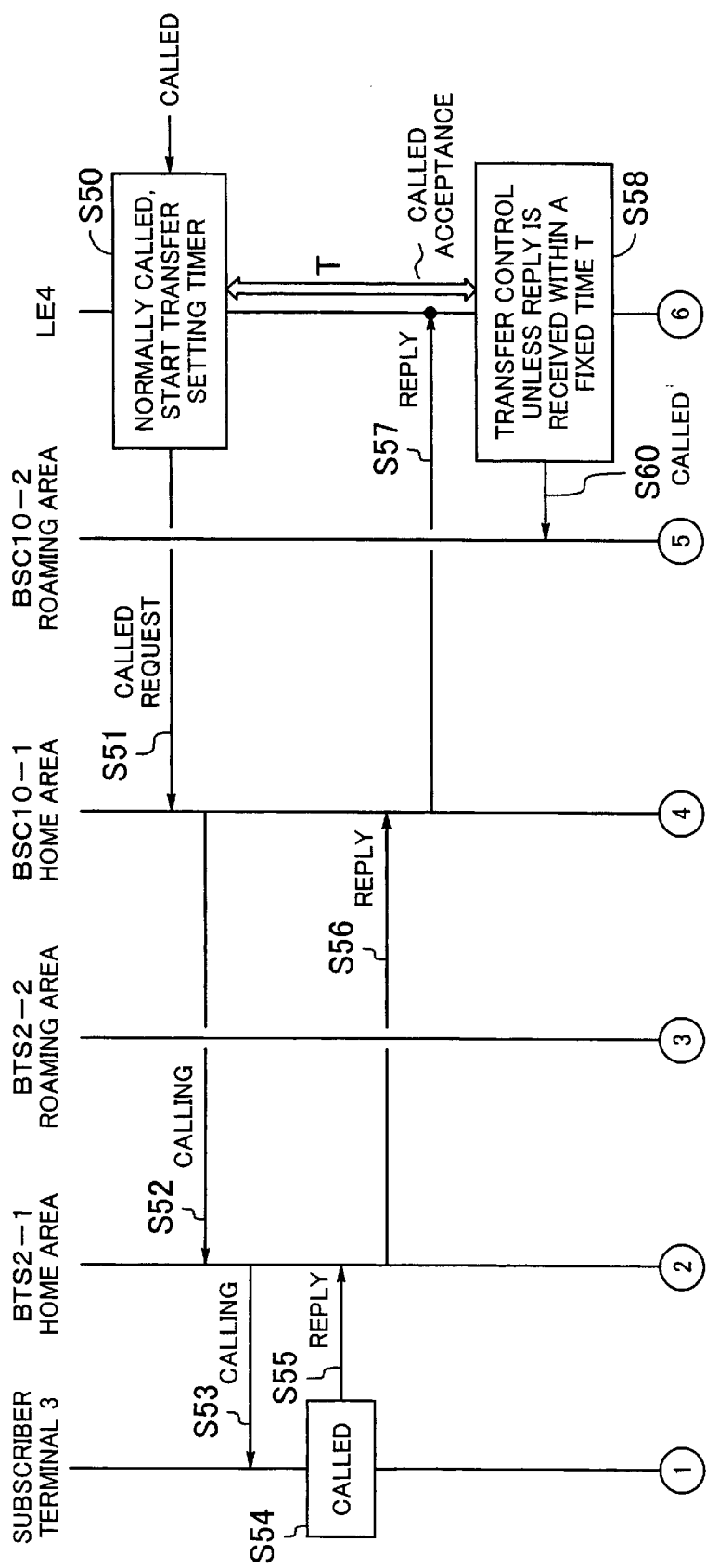
FIG. 9 shows a called sequence.
Figure 10:
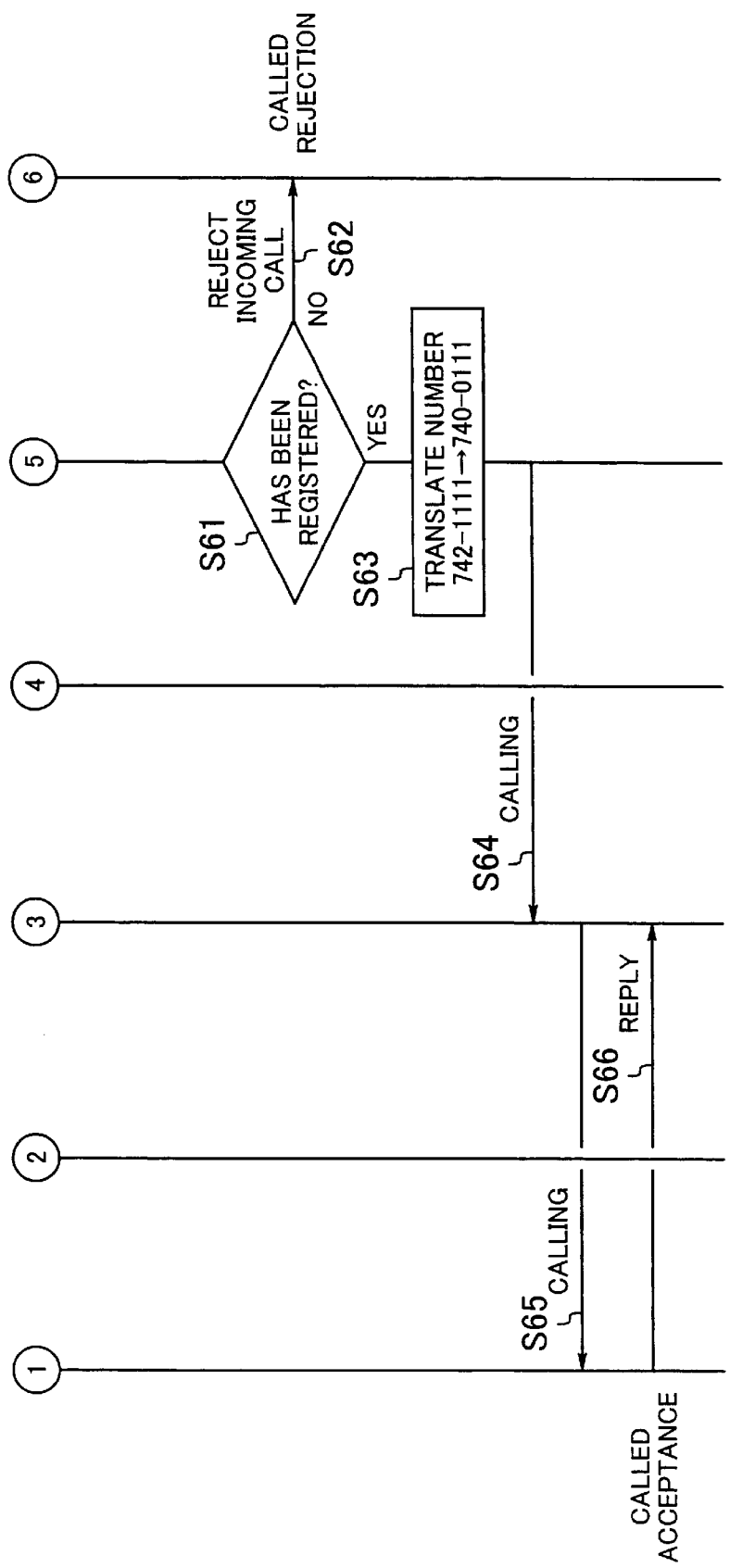
FIG. 10 shows another called sequence.

A description will now be given of an operation performed when the subscriber terminal 3 located in the area boundary is called. The location registration operation for the subscriber terminal 3 located in the roaming area E2 is the same as has been described with reference to FIG. 5, and the calling operation is the same as has been described with reference to FIGS. 3 and 6, whereby a description thereof will be omitted here. FIGS. 9 and 10 are sequence diagrams of the called operation.

In step S50, the LE 4 performs the normal called operation in response to the incoming call, and starts a transfer setting timer.

In step S51, the LE 4 sends the called request to the BSC 10-1 in the home area E1.

In step S52, the BSC 10-1 calls the BTS 2-1 in the home area E1.

In step S53, the BTS 2-1 calls the subscriber terminal 3.

In step S54, the subscriber terminal 3 is located in the home area E1 and is called.

In step S55, the subscriber terminal 3 sends a reply to BTS 2-1.

In step S56, the BTS 2-1 sends a reply to the BSC 10-1.

In step S57, the BSC 10-1 sends a reply to the LE 4 (the incoming call acceptance).

In step S58, if no reply is received within a fixed time T after the transfer setting timer of the LE 4 is initiated, the transfer control as has been described with reference to step S10 of FIG. 4.

In step S60, the LE 4 sends to the BSC 10-2 the called request including the L3 address (A000) corresponding to the roaming area subscriber number (742-0111).

In step S61, the call connection processing unit 12 in the BSC 10-2 determines whether the subscriber terminal 3 has been registered with the roaming subscriber data table 11a. If registration has been made, the process proceeds to step S63. Otherwise, the process proceeds to step S62.

In step S62, the call connection processing unit 12 in the BSC 10-2 sends the rejection of call to LE 4 (incoming call rejection).

In step S63, the call connection processing unit 12 of the BSC 10-2 translates the roaming area subscriber number (742-0111) into the home area subscriber number (740-1111) with the roaming subscriber data table 11a.

In step S64, the call connection processing unit 12 of the BSC 10-2 calls the BTS 2-2 with the home area subscriber number 740-1111).

In step S65, the BTS 2-2 calls the subscriber terminal 3.

In step S66, the subscriber terminal 3 replies to the calling from the BTS 2-2.

Figure 11:
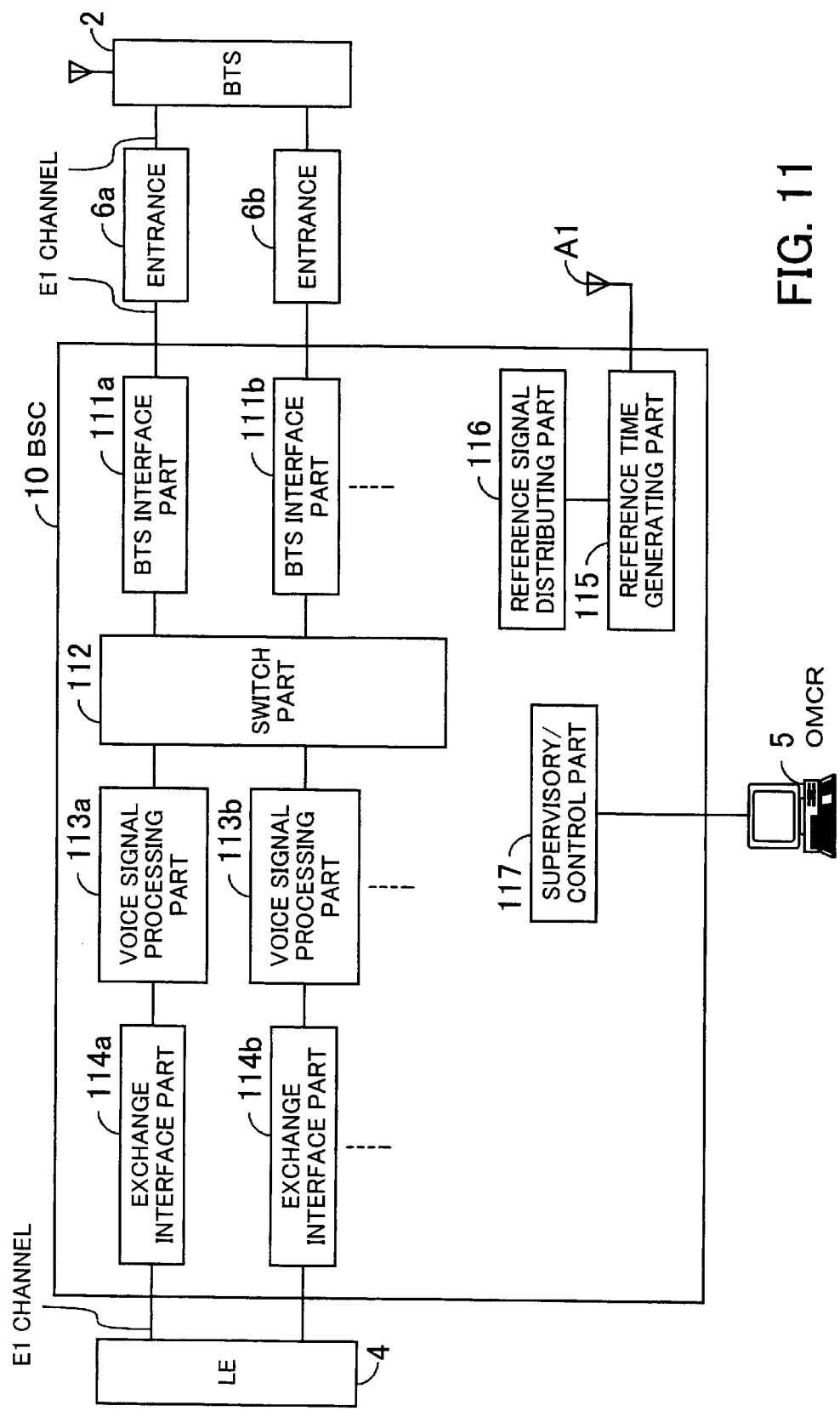
FIG. 11 is a schematic diagram of a block structure inside a BSC.
Figure 12:
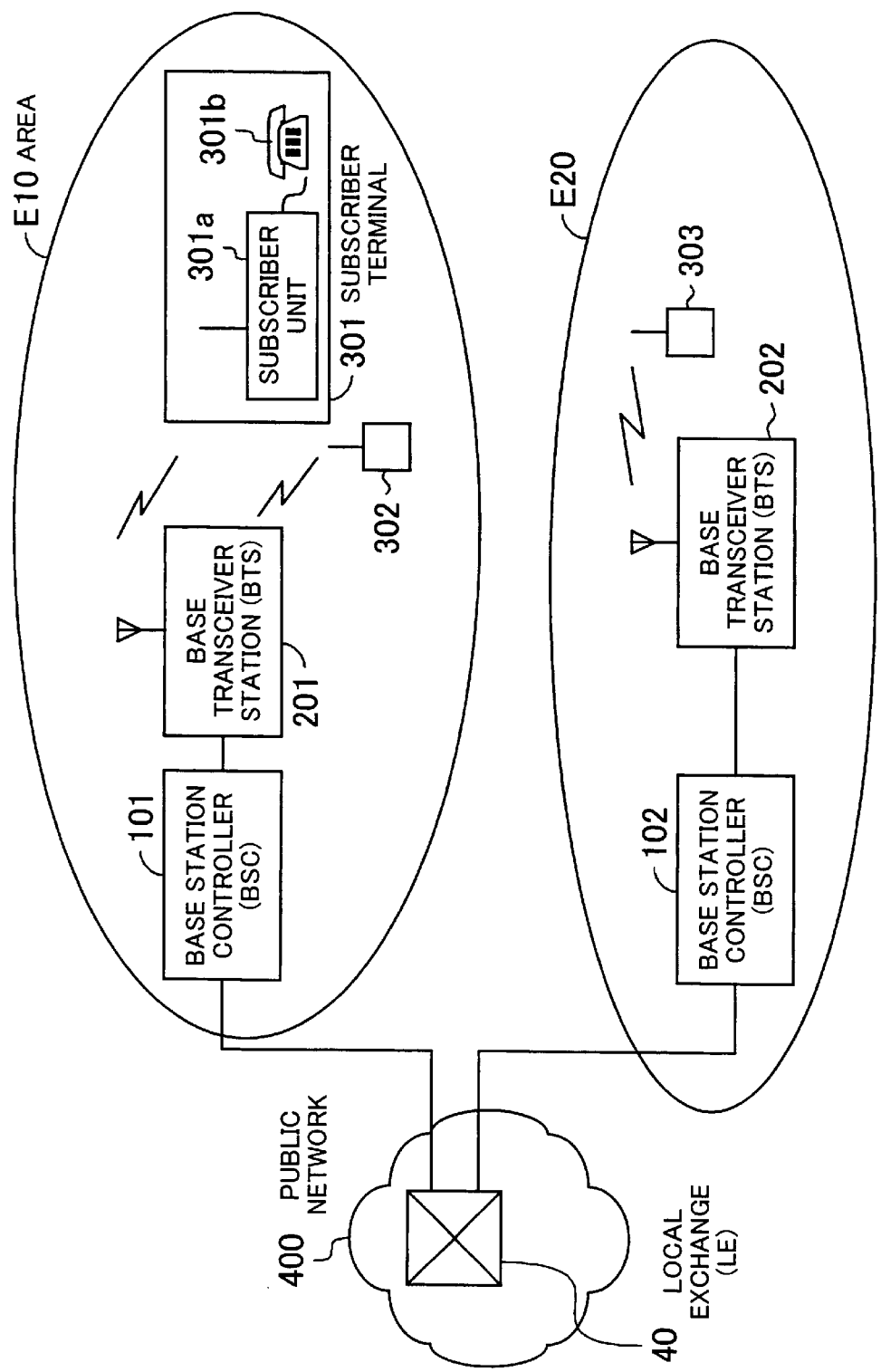
FIG. 12 is a diagram of the basic structure of a WLL system.

The internal block structure of the BSC is now described. FIG. 11 is a schematic block diagram of the internal structure of the BSC. The BSC 10 is connected to the LE 4 via the E1 channels of the V5 interface, and is connected to the BTS 2 via entrances 6a and 6b for each E1 channel. Further, the BSC 10 is connected to OMCR 5 via the LAN channel.

The identification number management unit 11 of the present invention is included in a supervisory/control part 117, and the call connection processing unit 12 is also included therein.

BTS interface parts 111a and 111b terminate the E1 interface with the BTS 2. A switch part 112 performs a routing control for resources of the air-side interface and the LE-side interface. Voice signal processing parts 113a and 113b perform a voice process such as QCELP for voice signals. Exchange interface parts 114a and 114b terminate the E1 interface with the LE 4.

When the communication system conforms to CDMA, provided are a reference time generating part 115 and a reference signal distributing part 116. The reference time generating part 115 generates a reference time and a reference clock from a GPS (Global Positioning System) signal received via an antenna A. The reference signal distributing part 116 distributes the reference time generated at the reference time generating part 115 to the structural parts.

The supervisory control unit of the present invention corresponds to the supervisory control part 117, which is connected to the OMCR 5 and performs supervisory control based on instructions from the OMCR 5. Further, the supervisory control part 117 informs the OMCR 5 of information about the working condition of the WLL.

As described above, the communication controller 1 of the present invention manages the home area identification number and the roaming area identification number, and translate them into each other for call connection processing.

Thus, the roaming is enabled only by changing the roaming subscriber data table 11a in the BSC without rewriting the numbers of the subscriber terminals. Thus, it is possible to provide the users with services promptly.

Even if a call connection is made in the area boundary in which the air condition is not stable, the call can be connected in the area having a better radio condition.

As described above, the communication controller of the present invention manages the home area identification number and the roaming area identification number and translates them into each other for call connection processing. Thus, it is no longer needed to rewrite the subscriber numbers with troublesome work even if the subscriber changes the area. It is therefore to efficiently make a call connection and improve the communication service.

The base station controller of the present invention manages the home area identification number and the roaming area identification number and translates them into each other for call connection processing. Thus, it is no longer needed to rewrite the subscriber numbers with troublesome work even if the subscriber changes the area. It is therefore to efficiently make a call connection and improve the communication service.

The communication system of the present invention manages the home area identification number and the roaming area identification number and translates them into each other for call connection processing. Thus, it is no longer needed to rewrite the subscriber numbers with troublesome work even if the subscriber changes the area. It is therefore to efficiently make a call connection and improve the communication service.

The foregoing is considered as illustrative only of the principles of the present invention. Further, since numerous modifications and changes will readily occur to those skilled in the art, it is not desired to limit the invention to the exact construction and applications s shown and described, and accordingly, all suitable modifications and equivalents may be regarded as falling within the scope of the invention in the appended claims and their equivalents.

What is claimed is:

1. A communication controller performing a connection control of roaming in which a subscriber terminal moves from a home area to a roaming area, said communication controller comprising:
    an identification number management unit which manages a home area identification number assigned to the subscriber terminal in the home area and a roaming area identification number assigned thereto in the roaming area; and
    a call connection processing unit which translates the home area identification number and the roaming area identification number into each other for call connection processing, wherein said identification number management unit manages a home area subscriber number that is the home area identification number, and a roaming area subscriber number and a roaming area network address that are the roaming area identification number.

2. The communication controller according to claim 1, wherein, when the subscriber terminal issues a request for location registration, said call connection processing unit allows the location registration when the subscriber number of the subscriber terminal has been registered with the home area identification number or the roaming area identification number.

3. The communication controller according to claim 1, wherein, when the subscriber terminal issues a calling request in the roaming area, said call connection processing unit makes a call connection with the home area identification number on an air interface side and makes a call connection with the roaming area identification number on an exchange interface side.

4. The communication controller according to claim 1, wherein, when the subscriber terminal in the roaming area is requested to receive a call, said call connection processing unit makes a call connection with the home area identification number on an air interface side and makes a connection with the roaming area identification number on an exchange interface side.

5. A base station controller performing a connection control of roaming in which a subscriber terminal moves from a home area to a roaming area, said base station controller comprising:
    a communication controller including an identification number management unit which manages a home area identification number assigned to the subscriber terminal in the home area and a roaming area identification number assigned thereto in the roaming area, and a call connection processing unit which translates the home area identification number and the roaming area identification number into each other for call connection processing; and
    a supervisory control unit which performs supervisory control while being connected to an operation and maintenance center.

6. A communication system performing a connection control of roaming in which a subscriber terminal moves from a home area to a roaming area in a WLL, said communication system comprising:
    a radio base station that radio-communicates with the subscriber terminal;
    a local exchange; and
    a base station controller including an identification number management unit which manages a home area identification number assigned to the subscriber terminal in the home area and a roaming area identification number assigned thereto in the roaming area, a call connection processing unit which translates the home area identification number and the roaming area identification number into each other for call connection processing, and a supervisory control unit which performs supervisory control while being connected to an operation and maintenance center.

7. The communication system according to claim 6, wherein the home area identification number and the roaming area identification number are set by the operation and maintenance center that integrally supervises said base station controller.

8. A communication controller performing a connection control of a subscriber terminal located close to an area boundary and located in a home area or a roaming area on the basis of a radio condition, said communication controller comprising:

an identification number management unit which manages a home area identification number assigned to the subscriber terminal in the home area and a roaming area identification number assigned thereto in the roaming area; and a call connection processing unit which translates the home area identification number and the roaming area identification number into each other for call connection processing, wherein said identification number management unit manages a home area subscriber number that is the home area identification number, and a roaming area subscriber number and a roaming area network address that are the roaming area identification number.

* * * * *